United States Patent [19]

Ohs et al.

[11] Patent Number: 4,711,538
[45] Date of Patent: Dec. 8, 1987

[54] ADJUSTABLE SUPPORT DEVICE FOR VEHICLE SIDE VIEW MIRROR

[75] Inventors: Gary L. Ohs; Timothy W. Byers, both of Whitefish, Mont.

[73] Assignee: Creative Sales & Mfg. Co., Inc., Whitefish, Mont.

[21] Appl. No.: 912,987

[22] Filed: Sep. 29, 1986

[51] Int. Cl.[4] .................. B60R 1/06; G02B 7/18
[52] U.S. Cl. .................... 350/604; 350/639; 248/480; 248/298
[58] Field of Search ............. 350/639, 632, 604; 248/480, 476, 475.1, 486, 298

[56] References Cited

U.S. PATENT DOCUMENTS 4,451,021  5/1984  Merriss ..................... 248/480

Primary Examiner—Jon W. Henry
Attorney, Agent, or Firm—George M. Cole

[57] ABSTRACT

An adjustable side view mirror assembly (50) which includes a conventional pivotal mounting bracket (20) having an upper generally horizontal support portion (38). An adapter block has two halves (70,72) with matching slots (76) and (74) one above the other. The lower slot (74) is mounted on support portion (38) while the upper slot receives a slide bar (90). The mirror (22) is mounted at the outer end (92) of the slide bar (90) while stop means (96) are located at the inner end (94) to prevent the bar from sliding on through. A threadable member (102) locks the slide bar in the desired position.

5 Claims, 4 Drawing Figures

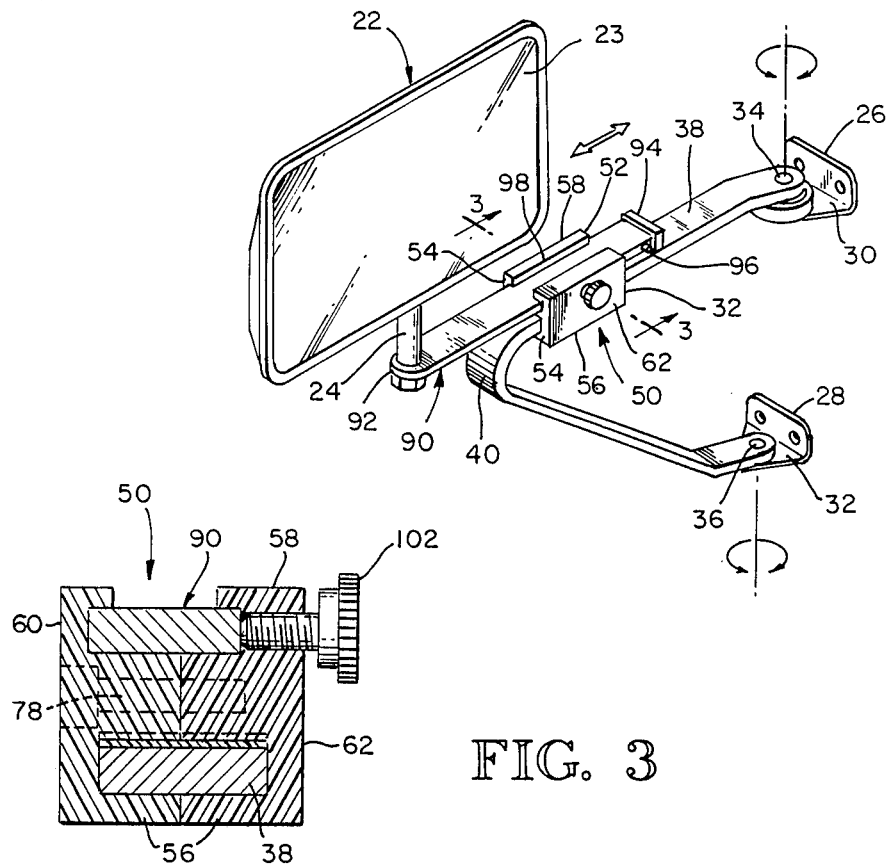

ADJUSTABLE SUPPORT DEVICE FOR VEHICLE SIDE VIEW MIRROR

TECHNICAL FIELD

The invention relates generally to the field of side mounted, outside mirrors for cars and trucks and more particularly to a side mounted mirror which is horizontally movable and adjustable.

BACKGROUND ART

As operators are aware, vehicles used for carrying loads and towing, whether they be automobiles, pick-up trucks, vans or the like, frequently have a conventional side view mirror which does not enable the driver to see to the rear. This is particularly so where, for instance, an extra wide tow or load is involved such as a boat trailer, trailer home, camping trailer or high and wide load. Campers on the beds of pick-up trucks are another example. These loads are most often not only wide but long and the standard side mounted mirror simply does not permit an adequate line of vision to the rear of the load or tow. In addition there is the problem of blurring caused by vibration of the mirror on its mounting.

One solution with which many drivers are familiar is the extended mirror mounting frame which holds the mirror far enough away from the side of the vehicle so that the driver can observe to the rear of his load or tow. But the extra wide mirror mounts are usually a three point support frame structure attached to the outside of each front door panel. Unlike many if not most conventional mirror mounts which are rotatable or can fold back, the three point support frame is fixed. If the conventional rotatable mount is accidentally struck, it will collapse or fold back without damage to itself or to the door panel. On the other hand if a three point extended mirror frame is hit substantial damage can be done to the door panel or to the mounting frame itself.

One solution is to change back to the conventional mirror mount when the vehicle is not being used to carry a load or to tow. However, changing mirror mounts is tedious and time consuming.

The broad concept of a laterally adjustable mirror, from a first position near the door and door window to an outer or extended second position to establish a line of vision rearwardly of a load or tow, is old. In U.S. Pat. No. 4,165,156 to O'Connell a fold back mounting frame bracket is used together with a pivot arm for the mirror. The structure allows the mirror to be at a conventional distance from the driver's window. It also allows the driver to pivot the mirror to an outer position thus enabling him or her to see behind a load or tow.

Another structure for horizontal outward adjustment of a vehicle mirror is found in U.S. Pat. No. 4,111,532 which is a temporary or substitute mirror mounted on the existing side view mirror. The structural principles in this example are significantly different from the instant device.

In U.S. Pat. No. 4,558,930 to Deedreek an outwardly extendable mirror is provided by a motor driven rack and pinion. the mirror itself is also pivotable with an electric motor driven set of gears. The structure is unrelated to this invention.

U.S. Pat. No. 4,247,173 to Vitalone shows another structurally unrelated system for extending and retracting and outside rear view mirror. And finally, British Patent Specification No. 499,802 shows a very complicated structure for laterally extending and retracting a mirror. Again, it is not pertinent to the teaching herein.

SUMMARY OF THE INVENTION

The invention comprises a structure which utilizes the existing mirror mounting frame bracket. The mirror is detached from the bracket and an adapter block attached to the frame bracket. The block is in two parts and includes a slide bar which can be locked and unlocked to slide through the adapter block. The mirror after being removed from the mounting frame bracket is reattached to slide bar. The mirror can be located as desired between a first retracted position and an adjustable extended position. A lock screw enables quick and dependable repositioning of the mirror.

Accordingly it is among the many features of the invention to provide a horizontally adjustable and repositionable exterior side view mirror support structure which is uniquely simple, inexpensive, rugged and durable. The mirror support device allows the vehicle owner to utilize the existing mounting frame bracket such that the mirror itself is disconnected and replaced on the support structure of this invention. In place of the mirror on the bracket is installed an adapter block and slide bar. The mirror is mounted on the slide or adjustment bar and the bar slidably received in a slot in the adapter block. No special tools are required to install the invention and it is not necessary to drill any holes. The invention is designed to be tamper proof and retains the advantage of retaining the original collapsible or fold back two point mounting bracket.

BRIEF DESCRIPTION OF THE DRAWINGS

FIG. 1 is a view in perspective of a conventional or prior art style of mirror and its mounting frame;

FIG. 2 is a perspective view of the invention installed on the conventional mounting frame bracket;

FIG. 3 is a cross section view taken along the ine 3—3 of FIG. 2 showing details of the mounting block.

BEST MODE FOR CARRYING OUT THE INVENTION

Figure 4:
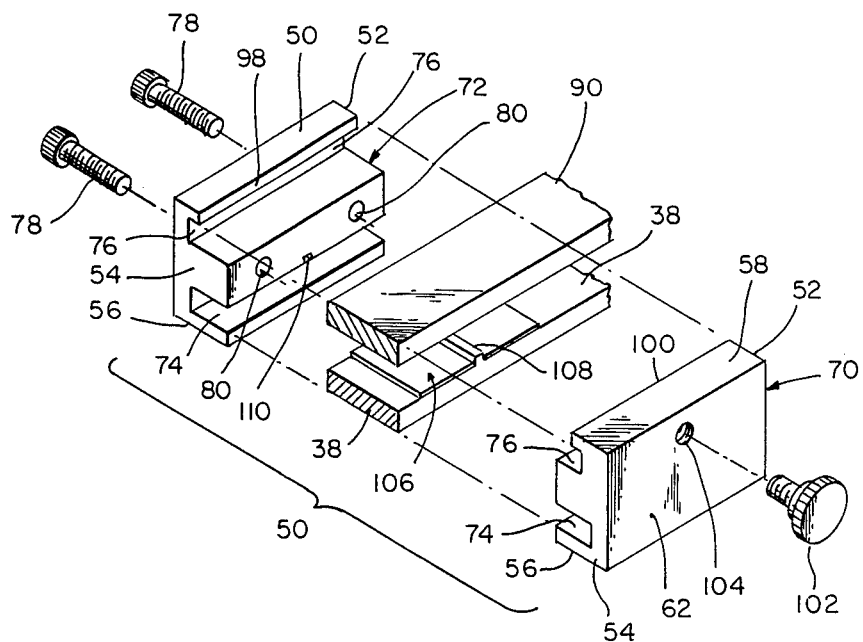
FIG. 4 is an exploded view in perspective showing additional details of the adapter block.

Referring now to the drawings it will be seen that a conventional pivotal, two point support frame bracket generally designated by the number 20 supports mirror 22 by a mounting arm 24 which is detachably connected to bracket 20. Bracket 20 is attached to a vehicle on the outside door panel of the vehicle. Bracket 20 in turn is securely attached to the vehicle door panel by a pair of L-shaped support leafs 26 and 28. The leafs are held firmly in place by screws and each has a generally horizontally projecting portion 30 or 32 to which the bracket is mounted on upper and lower pivot axes 34 and 36 respectively. The pivots as may be appreciated are tight so that the frame bracket 20 will move about the axes only by the application of substantial force or by a sharp blow. Such force or blow will move the bracket so as to reposition it or, in the case of being hit, it will collapse or fold around the pivot axes. The frame bracket 20 has a generally horizontal upper portion 38 at the outer end of which is the upright arm 24 which holds mirror 22. The outer end of upper portion 38 curves downwardly as at 40 and extends downwardly and inwardly at an angle as lower frame portion 42 and thence attaches to the leaf projecting portion 32.

After the mirror 22 and arm 24 are removed from the bracket 20 the block and adjustment or slide bar are installed. The adapter block, generally designated by the number 50, is a rectangular member having an inner end 52 and an outer end 54. In addition the adapter block 50 has bottom surface 56, top surface 58, front side surface 60 and rear side surface 62.

Block 20 is comprised of two halves, namely back block half 70 and forward block half 72. Block halves 70 and 72 are provided with a lower first slot shown as rectangular in shape to accommodate upper portion 38 of the bracket frame. Located above and in spaced relation to the lower slot 74 is a second or upper slot 76 to receive the adjustment or slide bar to be described in detail hereinafter. The two halves are held together by allen screw type threaded members 78 received in threaded holes 80 and which extend from block half 72 into into block half 70. When the adapter block is being installed it will be apparent that the block halves will be brought together on each side of portion 38 of the frame bracket and the threaded members 78 then tightened firmly into place to securely clamp the block onto the bracket.

The adjustment or slide bar, generally designated by the number 90, is an elongated member of rectangular cross section as shown in the several views of the drawings. Bar 90 has an outer end 92 at which end the upright mirror support arm 24 is secured and which holds the mirror 22. The inner end 94 of the slide bar includes stop detents 96, one each on either side of the bar as shown in FIG. 2. When the bar 90 is mounted in the upper slot 76 by bringing the two halves together and securing them with threaded bolts or screws 78, sufficient size is designed into the slot so that the bar 90 slides readily through the block slot. The stop detents 96 prevent the inner end of the bar from sliding on through. In like manner the outer end of bar 92 is prevented from sliding on through the slot by the mirror supporting arm 24 and its related structure like the bolt on the underside of the bar. As can be seen the upper side 58 of the block is partially open so that the edges 98 and 100 are spaced from each other to expose part of the slide bar 90.

A lock nut 102 is received in the inner half block in threaded opening 104 to hold the bar in position once it is located to the driver's satisfaction. Also a shim structure 106 having a center ridge 108 which is received in the groove 110 which extends laterally across both block halves. The shim may be necessary since the thickness of the frame portion 38 of the bracket may be smaller in some models. Thus the shim becomes necessary in order that the block can be secured in position.

We claim:

1. In a side mounted rear view mirror assembly for vehicles including a pivotal mounting frame bracket which is mounted on a vehicle exterior panel and wherein said bracket includes a generally horizontal upper support section, the improvement, comprising:
   (a) a generally rectangular adapter block means detachably and slidably mounted on said upper support section of said bracket and including a first inside end and a second outside end and having a first slot extending from said first to said second end for being received on said upper support section, said block means also including a second slot means above said first slot means extending from said first to said second end, said adapter bar being divided into two parts,
   (b) an elongated slide adjustment bar means having an outer mirror mounting end and an inner retaining end and being slidably received in said second slot means of said block means for limited reciprocally slidable movement in said second slot, said bar means supporting a rear view mirror at its outer mirror mounting end, and
   (c) said block means including a releasable lock means for adjustably holding said bar means such that said rear view mirror is positionable as desired between a first retracted position and a second extended position.

2. The side mounted rear view mirror assembly according to claim 1 and wherein said block means is made of said two parts divisible along a plane extending longitudinally of said slide bar means and such that the two parts have matching cavities to form said first and second slots so that when joined together they may be firmly secured on said upper support section and such that said slide bar means may be slidably and lockably positioned in said second slot.

3. The side mounted rear view mirror assembly according to claim 2 and in which said releasable lock means is a threaded bolt member.

4. The side mounted rear view mirror assembly according to claim 3 and wherein said second slot means is partially open along the upper surface of said slide bar means from said first inside to said second outside end of said block means.

5. The side mounted rear view mirror assembly according to claim 1 and wherein said inner end of said slide adjustment bar means has stop means thereon to prevent said bar from sliding on through said second slot means.

* * * * *